(No Model.) 2 Sheets—Sheet 1.
J. RICHARDSON.
SPEED GOVERNOR.
No. 253,102. Patented Jan. 31, 1882.
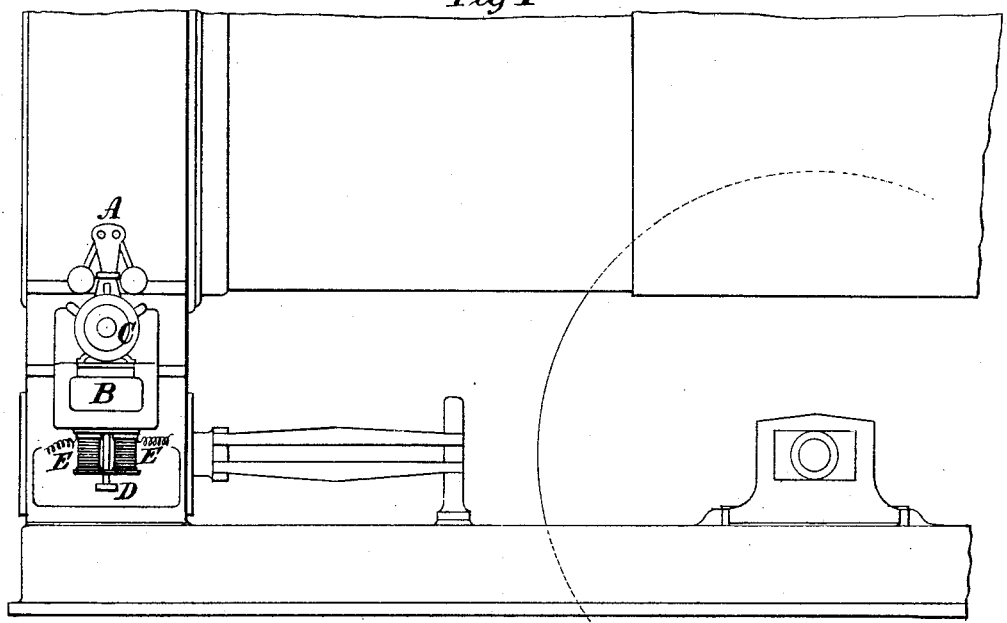
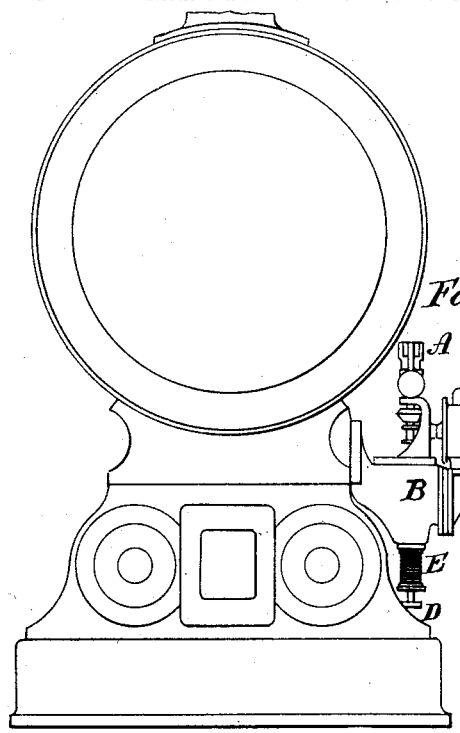
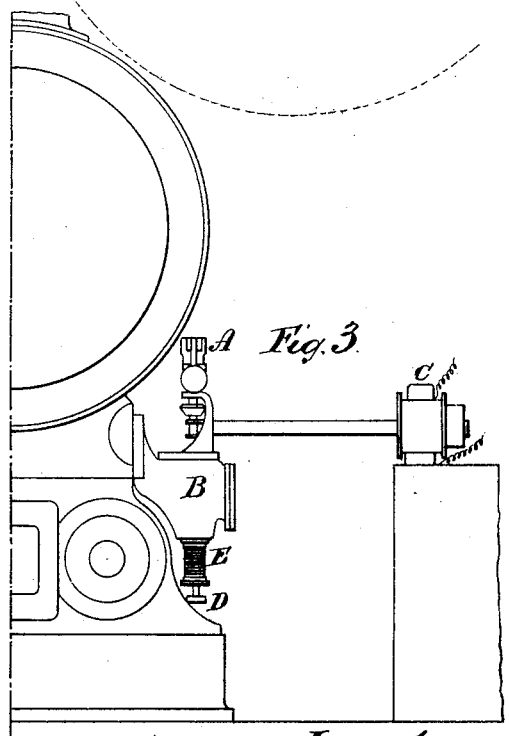
Witnesses.
J. A. Rutherford
Robert Everett
Inventor.
John Richardson
By James L. Norris
Atty.

(No Model.) 2 Sheets—Sheet 2.
J. RICHARDSON.
SPEED GOVERNOR.
No. 253,102. Patented Jan. 31, 1882.
Fig. 4. Fig. 5.
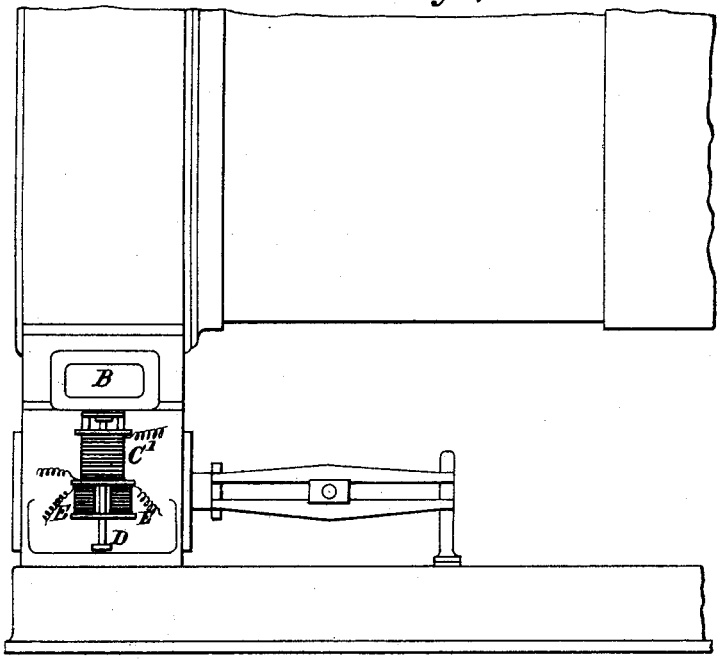
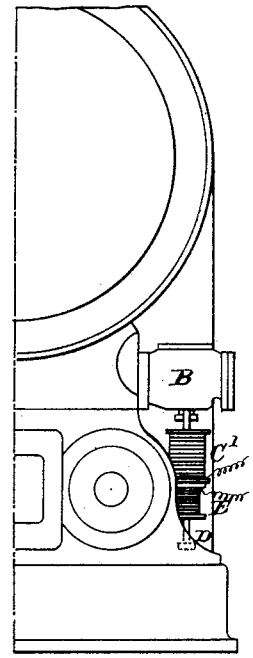
Fig. 6. Fig. 7.
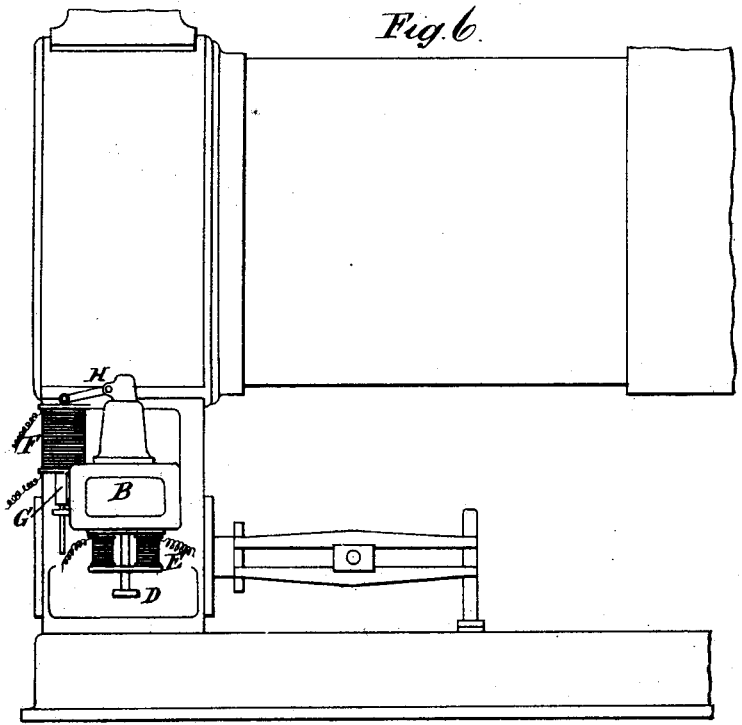
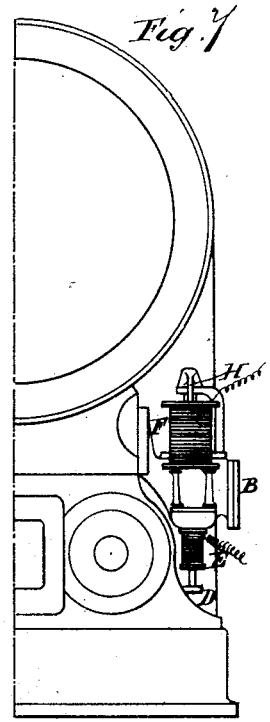
Witnesses.
J. A. Rutherford
Robert Everitt
Inventor.
John Richardson.
By James L. Norris.
Atty.

UNITED STATES PATENT OFFICE.

JOHN RICHARDSON, OF LINCOLN, COUNTY OF LINCOLN, ENGLAND.

SPEED-GOVERNOR.

SPECIFICATION forming part of Letters Patent No. 253,102, dated January 31, 1882.

Application filed December 7, 1881. (No model.) Patented in England January 22, 1881.

*To all whom it may concern:*

Be it known that I, JOHN RICHARDSON, a subject of the Queen of Great Britain, residing at Lincoln, in the county of Lincoln, England, have invented a new and useful Improvement in Speed-Governors, (for which I have obtained a patent in Great Britain, No. 288, bearing date January 22, 1881,) of which the following is a specification.

This invention relates to an improved method of and appliances for controlling and regulating the speed of engines employed for driving dynamo-electric machines, which have to be driven at an absolutely-uniform speed; and to effect this I fit the engine steam-passage with an equilibrium throttle-valve, which is acted upon by a sensitive high-speed governor; but instead of driving this governor in the ordinary manner by cords, belts, or gearing direct from the engine, I mount upon the governor itself a small dynamo-electric machine which is actuated by the same current as that which produces the light, so that its power shall vary in the same proportion as the intensity of the current varies. When the current of electricity generated by the machine shall have reached a sufficient intensity such a speed will be communicated to the governor that it will at once cut off any further admission of steam, and thus keep the engine at that speed; and, on the other hand, should the intensity of the current be reduced through lack of speed in the machine, this being instantaneously communicated to the governor, its speed will be checked in the same proportion and a correspondingly-increased quantity of steam admitted to the engine, thus restoring the current to its normal intensity. In connection with this governor is an electric magnet which holds a weight suspended so long as the current is passing through it; but in case of any accident to the belts or gearing driving the electric machine, so as to cause its stoppage, this magnet ceases to act, and the descending weight instantly shuts off all steam from the engine.

Another way in which this invention could be applied where it is inconvenient or impracticable to drive the governor by an electromotor: I so connect the governor with an electric magnet as to cause it to open or close its throttle-valve in proportion to the strength or weakness of the current generated by the dynamo-electric machine.

The manner of carrying my invention into practice is exemplified in the annexed sheets of drawings.

Sheet 1, Figures 1, 2 and 3, show side and end elevations of a Robey engine.

A is a high-speed governor, acting direct upon an equilibrium-valve contained within the chest B. Instead of driving this governor in the ordinary manner by a belt, strap, or gearing from the engine, I drive it by a small electromotor, C, which may be attached direct to it, as shown in Fig. 2, (being of course insulated in a suitable manner;) or it may be fixed at a distance, as shown in Fig. 3. It is evident there are many ways in which this motor could drive the governors, which are immaterial to the principle of the invention. This electromotor is actuated by a portion of the main current which produces the electric light, and its speed varies in relation to the intensity of the said current, so that when the large dynamo-machine which produces the current has reached such a speed as gives the required intensity the governors at the same time attain sufficient speed to shut off all further admission of steam, and whatever may be the variations of intensity in the current, these are instantaneously rectified by a greater or less admission of steam, thus maintaining the current at a practically-uniform intensity. It is evident that while the governing would be perfect so long as the large dynamo-machine was being driven, yet should any accident arise to the driving-belt of this machine or other connections between it and the steam-engine, so as to cause its stoppage, and therefore a cessation of current, the governors would instantly fall and full steam would be admitted to the engine. This is automatically prevented in the following manner:

The stalk of the equilibrium-valve is prolonged through the bottom of the valve-chest, as shown at D. Upon this is strung an electro-magnet, E, whose weight is sufficient to close the valve. So long as any current is passing a small portion of this is taken through the said electro-magnet, and is magnetically held to the under side of the valve-box B, thus leaving the equilibrium throttle-valve to be freely acted upon by the governor. The moment the current ceases, however, this loses its magnetic force and falls upon the collar of the stalk D, thus holding it down and preventing any further admission of steam. It is evident that this method of governing may be applied to other classes of engine than that shown, and it may be modified in various ways.

In one modification (shown on Sheet 2, Figs. 4 and 5 of the drawings) the centrifugal governor is entirely dispensed with. The stalk of the equilibrium-valve is continued through the bottom of the valve-chest B and passes through the core of an electro-magnet, C'. Upon this stalk is fixed an iron armature, and when the current passes through the electro-magnet C' this armature is attracted downward, so as to partially close the admission of the steam, and the position of this throttle-valve, and consequently the admission of steam, is regulated according to the intensity of this electro-magnet C'.

The throttle-valve is made of such area that its vertical motion need not be more than a fraction of an inch to give all the variations required from the full power of the engine to an absolute cut off of the steam.

To prevent the engine running away or "chasing" in case of accidental stoppage of the current, the same means are adapted as described in connection with Sheet 1, and are referred to by the same figures.

According to another modification, which I show at Figs. 6 and 7, instead of having an electro-magnet of comparatively feeble power, I use one of very intense power, the whole or a greater part of the current passing round it. This is shown at F. It is fixed to the valve-chest, though insulated from it, and is hollow. Through this hollow part its core G can freely move. The lower end of G is carried in a guide, and the upper end is attached to the long arm of a lever, H, the short arm of which regulates the position of an equilibrium throttle-valve. As soon as an electric current passes through F the tendency of G is to rise within F until its poles are coincident with the ends of F. In so doing it presses the equilibrium-valve upon its seat, and prevents any further admission of steam so soon as the current has its required intensity. In the case of an accidental stoppage the same means are adopted to stop the engine as described, and are referred to by the same letters.

Having fully described my invention, what I desire to claim, and secure by Letters Patent of the United States, is—

1. The combination, with the throttle-valve of an engine which drives the dynamo-electric machine to produce the current for electric lighting purposes, of a speed-governor acting on said valve and an electrical device, constructed essentially as described, which governs or controls the speed of the said governor and is included in the circuit the current through which produces the electric light, all substantially in the manner and for the purposes set forth.

2. The combination, with the throttle-valve of an engine which drives the dynamo-electric machine to produce the current for electric lighting purposes, of a speed-governor acting on said valve, and an electromotor which drives said governor and is included in the circuit the current through which produces the electric light, substantially as and for the purposes described.

3. The combination, with the throttle-valve of an engine and a dynamo-electric machine driven by said engine and serving to produce a current for electric lighting purposes, of an electro-magnet included in the circuit the current through which produces the electric light, and operated thereby to close said throttle-valve when the current through said circuit ceases, substantially in the manner and for the purposes set forth.

In witness whereof I have hereunto signed my name in the presence of two subscribing witnesses.

JOHN RICHARDSON.

Witnesses:
JOHN WILLIAMSON,
FRED TOM SISSING.